(12) United States Patent
Drnevich et al.

(10) Patent No.: US 6,360,524 B1
(45) Date of Patent: Mar. 26, 2002

(54) OXYGEN SEPARATOR DESIGNED TO BE INTEGRATED WITH A GAS TURBINE AND METHOD OF SEPARATING OXYGEN

(75) Inventors: Raymond Francis Drnevich, Clarence Center; Minish Mahendra Shah, East Amherst; Christian Friedrich Gottzmann, Clarence, all of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/879,113

(22) Filed: Jun. 13, 2001

Related U.S. Application Data

(62) Division of application No. 09/565,293, filed on May 4, 2000, now Pat. No. 6,293,084.

(51) Int. Cl.[7] .................................................. F02C 6/06
(52) U.S. Cl. ........................ 60/39.02; 60/39.07; 60/722; 96/4
(58) Field of Search .......................... 60/39.02, 39.07, 60/39.12, 922; 96/4, 6, 8, 10

(56) References Cited

U.S. PATENT DOCUMENTS

| | | | |
|---|---|---|---|
| 3,255,586 A | 6/1966 | Hennig et al. | 60/39.03 |
| 5,174,866 A | 12/1992 | Chen et al. | 204/59 |
| 5,516,359 A | 5/1996 | Kang et al. | 95/14 |
| 5,562,754 A | 10/1996 | Kang et al. | 95/54 |
| 5,590,519 A | 1/1997 | Almlof et al. | 60/39.33 |
| 5,820,654 A | 10/1998 | Gottzmann et al. | 95/54 |
| 5,820,655 A | 10/1998 | Gottzmann et al. | 95/54 |
| 5,852,925 A | 12/1998 | Prasad et al. | 60/39.02 |
| 5,865,878 A | 2/1999 | Drnevich et al. | 95/54 |
| 6,139,604 A | 10/2000 | Gottzmann et al. | 95/54 |
| 6,139,810 A | 10/2000 | Gottzmann et al. | 422/197 |
| 6,293,084 B1 * | 9/2001 | Drnevich | 60/39.02 |

OTHER PUBLICATIONS

Wright et al., "Advanced Oxygen Separation Membranes", Gas Research Institute, pp 33–41 (1990).

* cited by examiner

*Primary Examiner*—Ted Kim
(74) *Attorney, Agent, or Firm*—David M. Rosenblum

(57) ABSTRACT

An oxygen separator and method for separating oxygen from a heated oxygen containing gas that employs oxygen-selective ceramic membranes of elongated, tubular configuration within a duct for separation of oxygen from a heated gas. The duct can be attached between the exhaust of a gas turbine and a power generator driven by the exhaust or can be connected to one or more burners of a gas turbine. Supplementary compressed feed air may be added at a flow rate at least equal to that of the permeated oxygen for cooling and flow balancing purposes. A purge stream can also be introduced. Additionally, combustor tubes fabricated from an oxygen-selective ceramic membrane material may also be provided to produce combustion products that in turn can be used as a purge for downstream oxygen-selective ceramic membranes.

18 Claims, 11 Drawing Sheets

US 6,360,524 B1

OXYGEN SEPARATOR DESIGNED TO BE INTEGRATED WITH A GAS TURBINE AND METHOD OF SEPARATING OXYGEN

CROSS REFERENCE TO RELATED APPLICATIONS

This patent application is a divisional of U.S. patent application Ser. No. 09/565,293, filed May 4, 2000, now U.S. Pat. No. 6,243,084.

TECHNICAL FIELD

The present invention relates to an oxygen separator and method of separating oxygen that uses oxygen-selective, ion conducting ceramic membranes. More particularly, the present invention relates to such an oxygen separator in which such oxygen-selective ceramic membranes are located within a duct that is either directly connected to an exhaust of a gas turbine or connected to a burner of the gas turbine to receive air heated by combustion of a fuel.

BACKGROUND ART

Separation of oxygen from heated, elevated pressure air streams produced by gas turbines can readily be accomplished by oxygen-selective, ion conducting ceramic membranes because gas turbines produce more high temperature air than is required to support combustion within the turbine. In fact, there is a sufficient excess of high temperature air to allow for significant quantities of oxygen to be extracted as a by-product.

There are a number of references in the prior art that disclose integrations of gas turbines with oxygen separators that employ oxygen-selective, ion conducing ceramic membranes (hereinafter referred to in the specification and claims as "oxygen-selective ceramic membranes"). For instance, J. D. Wright et al., "Advanced Oxygen Separation Membranes", pp 33–61 (1990) discloses an integration in which compressed air is indirectly heated to the requisite membrane operating temperature by a fired heater. The air is then passed through the retentate side of the separator where a portion of the contained oxygen is transferred to the permeate side by a pressure driven ion conducting ceramic membrane. The oxygen depleted retentate is heated in a fired heater to turbine inlet temperature and is then expanded in a turbine to produce power. The fired heater contains a heat exchange coil for heating the separator feed. A similar integration is shown in U.S. Pat. No. 5,516,359. In this patent, air is compressed to an elevated pressure and is heated to a membrane operating temperature by a burner or by indirect heat exchange. The heated compressed air is then introduced to the retentate side of a membrane separator that extracts oxygen from the air. The oxygen depleted retentate is further heated to a turbine inlet temperature by direct combustion before being expanded in a turbine to generate power. U.S. Pat. No. 5,562,754 discloses the introduction of steam into the oxygen depleted retentate stream as a replacement for the separated oxygen and also deploys steam as a sweep gas for the permeate side of the membrane to improve the driving force for oxygen transfer.

U.S. Pat. No. 5,852,925 describes different process options that are especially suited for retrofitting existing installations. In one option, only a portion of the compressed air stream is processed by the membrane separator. The resultant oxygen depleted retentate is combined with a stream that has bypassed the separator prior to turbine expansion. Another option provides a separate air compressor to supply the membrane separator. The oxygen depleted retentate is heated in a second stage combustor and is then expanded in a turbine.

U.S. Pat. No. 5,865,878 introduces various concepts of integrating an oxygen-selective ceramic membrane with a gas turbine in which such reactants as steam and natural gas are introduced into the permeate side of the membrane separator to react with the permeated oxygen to form desired products such as syngas.

U.S. Pat. No. 5,820,654 discloses a process and apparatus in which oxygen is extracted from a heated oxygen containing stream by an oxygen-selective ceramic membrane in which the oxygen product is cooled through indirect heat transfer with a portion of the incoming air stream. The gas separation and cooling are integrated within a single apparatus to maximize the use of conventional materials and construction.

All of the foregoing references disclose separator-gas turbine integrations that require the use of ancillary equipment such as heat exchangers and long piping systems for extracting air and re-injecting oxygen depleted air. As may be appreciated, such equipment and piping adds to the complexity and expense of the integration of membrane separator and gas turbine. Additionally, long piping runs produce pressure drops and difficulties in providing the separator with a uniform flow distribution.

As will be discussed, the present invention provides oxygen separators and methods, employing oxygen-selective ceramic membranes, that are designed for integration with a gas turbine without the use of long piping runs. As a result, the pressure drop involved in handling the large air flow between the components of the system is minimized and flow distribution problems are reduced.

SUMMARY OF THE INVENTION

In one aspect, the present invention provides an oxygen separator for separating oxygen from a heated oxygen containing gas discharged from an expander of a gas turbine hot gas generator used to drive a power turbine. It is to be noted that a hot gas generator consists of an air compressor, a combustor and an expander which drives the compressor. The expander exhaust is at both elevated pressure and temperature and can be used to drive the power turbine which normally is on a separate shaft from the compressor-expander shaft. Usually the hot gas generator-power turbine combination is an aircraft derivative design.

The oxygen separator utilizes a duct open at opposite ends and configured to be directly mounted between the expander of the hot gas generator and the power turbine in an in-line relationship to receive the heated oxygen containing gas from the expander and to discharge an oxygen depleted gas to the power turbine. A plurality of oxygen-selective ceramic membranes are provided for extracting oxygen from the heated gas. Such membranes are mounted within the duct so that the oxygen separates from the heated oxygen containing gas. The separated oxygen collects within the oxygen-selective ceramic membranes and an external flow of the oxygen depleted gas forms within the duct. A means is provided for recovering the oxygen from said oxygen-selective ceramic membranes.

Since a duct containing the oxygen-selective ceramic membranes directly connects the exhaust of the expander with the power turbine, the integration is simply accomplished and with the avoidance of a significant pressure drop in extraction of the heated oxygen containing gas from the expander and the reintroduction of the oxygen depleted gas to the power turbine. Further, where oxygen separators are not integrated in the manner set forth above, pressure drops as high as between about 3.45 bar and about an 5.52 bar are often required at the reintroduction point to achieve adequate distribution. This is inefficient in that it requires a greater degree of compression in the first instance.

Another integration is with the burners of a gas turbine of an industrial type. The turboexpander of these units drives both the air compressor and other connected load such as generators or process compressors. The exhaust from the tuboexpander is typically at near atmospheric pressure. This aspect of the present invention provides an oxygen separator for separating oxygen from compressed air flowing to a burner of a gas turbine. An elongated duct, open at opposite ends, is configured to be connected to the burner of the gas turbine to receive a heated oxygen containing gas formed from the compressed air after having been heated and to discharge an oxygen depleted gas. A plurality of oxygen-selective ceramic membranes are provided for extracting oxygen from the heated gas. Such membranes are mounted within the duct so that the oxygen separates from the heated oxygen containing gas. The separated oxygen collects within the oxygen-selective ceramic membranes and an external flow of the oxygen depleted gas forms within the duct. A means is provided for recovering the oxygen from the oxygen-selective ceramic membranes.

The duct can be mounted between the burner and the gas turbine. Alternatively, a pre-burner can be provided to heat the compressed air and the duct is directly mounted between the pre-burner and the burner of the gas turbine. In such embodiment, the duct can form an inner duct. An outer duct, surrounding the inner duct and connected to said pre-burner, defines an annular space between the inner and outer ducts to transfer the compressed air to the pre-burner.

Such integration in accordance with the present invention is particularly advantageous in instances where there are overriding space constraints for the installation of the oxygen separator. Additionally, it allows for a simple integration in which a good distribution of the fuel-retentate mixture to the burners of the gas turbine is assured with substantially less required pressure drop than is required in separate systems of the prior art.

In either type of integration, the oxygen-selective ceramic membranes can be in line with the flow of the heated oxygen containing gas or at an angle thereto, for instance, at right angles. Additionally, each of the oxygen-selective ceramic membranes can be of elongated, tubular configuration and have closed ends and opposite, open ends. In such embodiment, the recovery means recover the oxygen from the open ends of the oxygen-selective ceramic membranes.

Advantageously, in an oxygen separator using tubular ceramic membranes, a plurality of elongated tubes can be coaxially located within the oxygen-selective ceramic membranes for injection of steam to purge the oxygen from within the membrane. A steam plenum is in communication with the elongated tubes and a steam inlet line passes through said duct and is connected to the steam plenum for introduction of the steam into the oxygen-selective ceramic membranes. This purge helps drive the oxygen permeation through the membrane.

Another advantageous alternative feature of an oxygen separator of the present invention using ceramic membranes of tubular form is to provide a shroud surrounding the oxygen-selective ceramic membranes. A supplemental cool air inlet passes through the duct and is connected to the shroud for introduction of cooling air to cool the oxygen product within the oxygen-selective ceramic membranes and the structure supporting the oxygen-selective ceramic membranes. In such alternative, a plurality of tube-like sleeves can be mounted within the oxygen-selective ceramic membranes to create a narrow flow annulus and thereby improve a heat transfer film coefficients on the side where the oxygen is flowing within the oxygen-selective ceramic membranes. The advantage of the forgoing feature of the present invention is that it allows for a cooler operation of the oxygen-selective ceramic membranes in regions where such membranes are to be sealed and supported and therefore, the use of conventional construction and materials.

In a further aspect, a plurality of burner tubes are provided that are fabricated from oxygen-selective ceramic membrane material for separation of the oxygen from the heated gas. A fuel inlet line passes through the duct for introduction of fuel and a fuel chamber is provided in communication with the open ends of the burner tubes. The fuel chamber is connected to the fuel inlet line to introduce the fuel into the burner tubes for combustion of the fuel in the presence of the permeated oxygen. The combustion produces combustion products including carbon dioxide. Transfer tubes are coaxially located within tubular oxygen-selective ceramic membranes and the burner tubes for transfer of the combustion products from the burner tubes to the oxygen-selective ceramic membranes.

In either type of integration contemplated by the present invention, oxygen-selective ceramic membranes of tubular configuration can be mounted within the duct through connection to a tube sheet that is itself connected to the duct. The oxygen recovery means can be formed of a header plate connected to the tube sheet and having at least one opening to allow passage of the oxygen from the open ends of said oxygen-selective ceramic membranes through the header plate. Additionally, a cover is connected to said header plate that covers the at least one opening and a discharge line is connected to the cover and passes through the duct.

In a still further aspect of the present invention, the duct can be formed by at least two sections with the header plate connected to at least one of the two sections and the tube sheet connected to the other of the two sections. In such aspect, the header plate and said tube sheet can be provided with peripheral flanges connected to one another to connect said two sections to one another.

Either type of integration contemplated by the present invention can also employ a supplemental cool air inlet of the duct for introduction of cooling air into the duct to cool the oxygen within the oxygen-selective ceramic membranes while heating the air. For such purposes, at least one opening of said header plate can comprise aligned radial arrays of openings. The tube sheet, header plate, and cover each can have an annular configuration to define aligned, concentric central inner openings thereof. A sleeve can be connected to the tube sheet and aligned with the central, inner opening thereof to conduct the heated oxygen containing gas to oxygen-selective ceramic membranes of tubular form downstream of the supplemental cool air inlet of said duct.

In yet another aspect, the present invention provides a method of separating oxygen from a heated oxygen containing gas discharged from an exhaust of a gas turbine hot gas generator used to drive a power turbine. In accordance with such method, the heated oxygen containing gas is received at one end of a duct mounted directly between the expander of the hot gas generator and the power turbine in an in-line relationship. The oxygen is extracted from the heated oxygen containing gas by permeating ions of the oxygen through a plurality of oxygen-selective ceramic membranes. The oxygen-selective ceramic membranes are mounted within the duct so that the oxygen separates from the heated oxygen containing gas by permeation. The permeated oxygen collects within the oxygen-selective ceramic membranes and an external flow of the oxygen depleted gas forms within the duct. The oxygen depleted gas is discharged from an opposite end of the duct to the power turbine and the oxygen is recovered from the oxygen-selective ceramic membranes.

In another aspect, the present invention provides a method of separating oxygen from compressed air flowing to a burner of a gas turbine. In accordance with such method, the compressed air is heated by burning a fuel to form a heated oxygen containing gas. The heated oxygen containing gas is received within an elongated duct open at opposite ends and connected to the burner of the gas turbine. The oxygen is extracted from the heated oxygen containing gas by permeating ions of the oxygen through a plurality of oxygen-selective ceramic membranes having closed ends and opposite, open ends. The oxygen-selective ceramic membranes are mounted within the duct so that the oxygen separates from the heated oxygen containing gas. The separated oxygen collects within the oxygen-selective ceramic membranes and an external flow of the oxygen depleted gas forms within the duct. The oxygen depleted gas is discharged from an opposite end of the duct and the oxygen is recovered from the oxygen-selective ceramic membranes.

In accordance with the directly foregoing aspect of the present invention, the heated oxygen containing gas can be received within one of the opposite ends of the duct from a pre-burner connected thereto and the oxygen depleted gas can be directly discharged to the burner of the gas turbine from the other of the opposite ends thereof.

An alternative inventive aspect of the foregoing method is to utilize ceramic membranes of tubular configuration and to introduce fuel into burner tubes mounted within the duct and fabricated from oxygen-selective ceramic membrane material for separation of the oxygen from the heated gas. The fuel is burned in the presence of oxygen permeated through the burner tubes to heat the compressed air stream and to form combustion products including carbon dioxide. The combustion products are transferred from the burner tubes to the oxygen-selective ceramic membranes to purge the oxygen.

In either method of the present invention, the oxygen after having been recovered is cooled and then compressed. The oxygen-selective ceramic membranes can be purged with an inert purge gas, preferentially steam, which can be separated from the oxygen simply by condensation. Further, a supplementary compressed feed air stream at least equivalent in volume to the oxygen product removed can be compressed and introduced into the duct to cool the oxygen and supporting structure.

BRIEF DESCRIPTION OF THE DRAWINGS

While the specification concludes with claims distinctly point out the subject matter that Applicants regard as their invention, it is believed that the invention will be better understood when taken in connection with the accompanying drawings in which:

In order to avoid needless repetition in the explanation and description of each element in the various embodiments illustrated in the drawings, the same reference numeral is used in such embodiments to designate elements having the same design and function.

Figure 1:
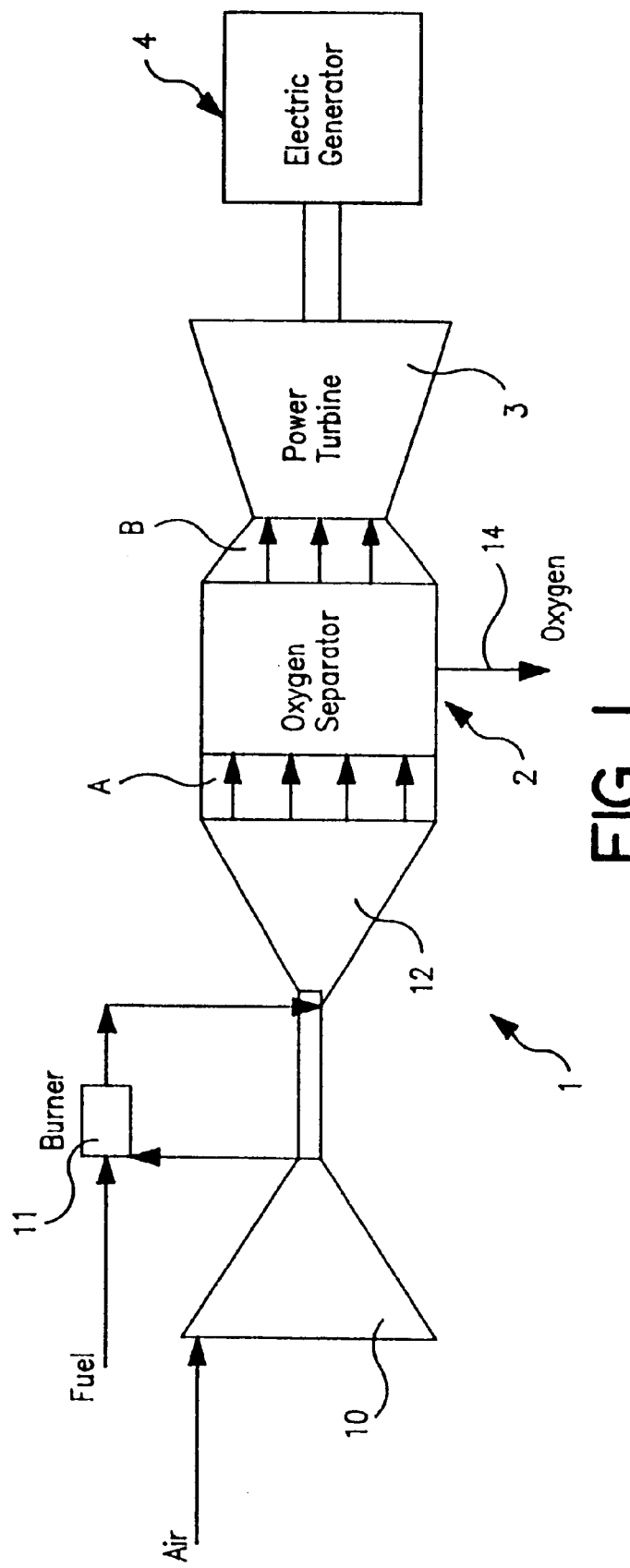
FIG. 1 is a schematic view of an oxygen separator in accordance with the present invention integrated with a gas turbine between a power turbine and the expander of the hot gas generator of the gas turbine.

Also to avoid unnecessary complication of drawings, commonly known elements, such as sealing gaskets between flanges, tube supports and means to provide flexibility in connecting pipes, are not shown. Also tube sheets and headers, depicted as flat in the drawings, could optionally be curved.

DETAILED DESCRIPTION

With reference to FIG. 1, an integration of a gas turbine hot gas generator 1 and an oxygen separator 2 in accordance with the present invention is illustrated. In such integration, a heated oxygen containing gas, produced from hot gas generator 1, is fed to oxygen separator 2 that contains oxygen-selective ceramic membranes to separate oxygen from the heated oxygen containing gas to produce an oxygen depleted gas that is used to drive a power turbine 3. Power turbine 3, as illustrated can be used to drive an electric generator 4.

The hot gas generator 1 is provided with a compressor 10 to compress air. Compressor 10 typically has no intercooling, although it can optionally be a multi-stage machine with inter-cooling. Fuel is burned in a burner or combustor 11 to heat the compressed air and thereby form compressed and heated air that is expanded to an intermediate pressure in an expander 12 to recover power for driving compressor 10. Typically the resulting heated oxygen containing gas "A", as an exhaust stream of hot gas generator 1, has a pressure in a range from between about 4.83 bar and about 6.9 bar and an oxygen content in a range of between 12 percent and about 17 percent. The temperature of heated oxygen containing gas "A" ranges between about 800° C. and about 900° C. and therefore is very suitable for further processing in oxygen-selective ceramic membranes to separate oxygen to produce an oxygen depleted gas "B". The separated oxygen can be recovered as an oxygen product stream 14. The membranes are of an ion transport type which can be comprised of mixed ion and electron conducting material or of a multiphase mixture of ion and electron conducting materials. In certain instances there are advantages of using materials that exhibit only ionic conductivity and therefore require external electric power for providing the driving force for oxygen ion transport. As will be discussed, although the present invention is illustrated with reference to such membranes being of tubular form and with permeated oxygen being recovered from open ends of such membranes, the present invention is not so limited. Known membranes in the form of flat plates are also possible and is intended that except where a specific form of membrane is discussed, claimed or illustrated, that the present invention is not limited to any particular membrane configuration.

The fuel introduced into the burner 11 can be any hydrocarbon or carbon containing gaseous or liquid stream. Typically it will be natural gas or syngas, if available. In case of syngas, the ratio of hydrogen to carbon monoxide can range from between about 0.5 and about 2.0. Syngas is an advantageous fuel in that it permits about 25 percent more heat generation per mol of oxygen reacted in the combustor. This leads to a somewhat higher oxygen content or oxygen partial pressure at the inlet to the oxygen-selective, ion transport ceramic membrane allowing a higher oxygen recovery pressure, less membrane area or higher oxygen recovery.

Figure 2:
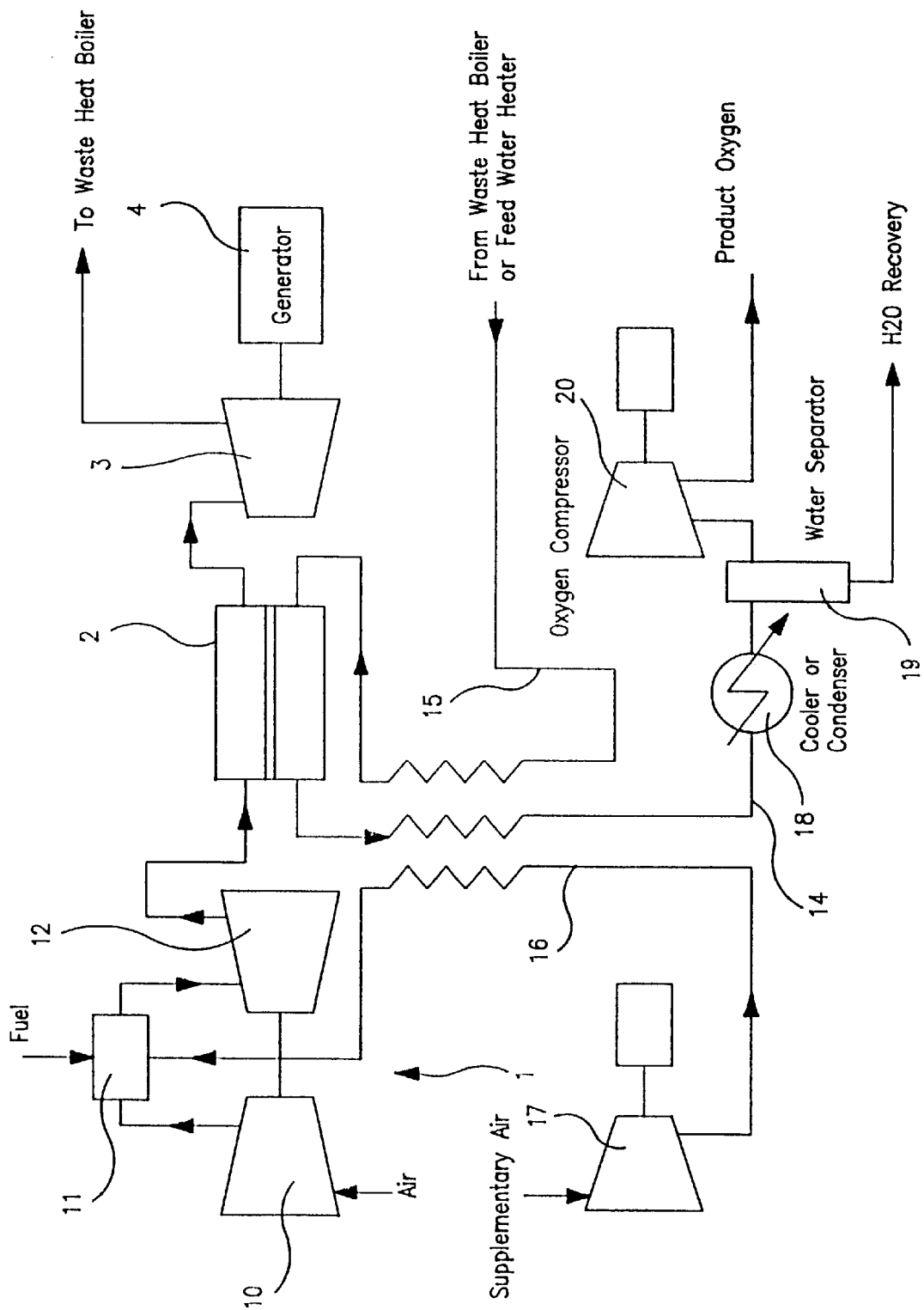
FIG. 2 is a process flow diagram of an integration incorporating an oxygen separator of the present invention with a supplemental compressed feed air stream and with stream purging.

With additional reference to FIG. 2, additional process modifications are illustrated using the basic system shown in FIG. 1. Oxygen product stream 14 can be cooled rejecting heat, preferably to other heat consuming resident applications, such as to steam generated in a waste heat boiler stream 15 and/or to a supplemental compressed feed air stream 16 produced by a supplemental compressor 17 to augment the flow of the exhaust from hot gas generator 1. In this regard, the use of such supplemental compressed feed air stream 16 is especially useful in a retrofit situation. Such a supplemental compressed feed air stream 16 is generally at least equivalent in volume to the amount of oxygen extracted, to a level above the feed pressure. This provides an economical heat sink for cooling oxygen product stream 14. It also permits use of an efficient multistage industrial air compressor with intercooling, which results in reduced power for air compression as compared to when all the air is compressed by the non-intercooled single stage gas generator compressor. Further, it reduces the mismatch between the power generating expander and the gas generator compressor in retrofit designs or installations.

As illustrated, supplementary compressed feed air stream 16 can be directly introduced into burner 11. It can also be added to the air stream between compressor 10 and burner 11. Alternatively, as will be discussed, such stream can be introduced into oxygen separator 2 for additional cooling purposes.

Typically the magnitude of partial oxygen pressures on the retentate side of the oxygen-selective, ion conducing membrane requires recovery of oxygen at a pressure substantially below atmospheric to maintain a positive driving force. Such a low recovery pressure can be avoided by employment of an electrically driven membrane in which electrodes are attached to an ion only conducting electrolyte and an electrical potential is provided by an external power source in a known manner to drive oxygen ions from the cathode or retentate side to the anode or permeate side.

Another way of avoiding a vacuum is to raise steam which is employed to purge the permeate side of the oxygen-selective, ion conducing ceramic membrane. At typical hot gas conditions of the exhaust of gas turbine 1 (pressure equal to about 6.21 bar, oxygen content equal to abut 15%, and oxygen recovery 33% of that contained in air), a steam content of about 40 volumetric percent at the permeate outlet is required to maintain the permeate side total pressure above atmospheric and the oxygen partial pressure low enough to avoid a pinch in the partial pressure ratio driving force. The available heat in the oxygen can produce about half of the required steam. The remainder can be generated by a waste heat boiler using heat available in the power turbine exhaust. Such is illustrated in FIG. 2 as waste heat boiler stream 15. Alternately, if it is inconvenient or uneconomical to raise the additional steam, the amount of steam generated by extracting heat from the product oxygen stream will permit operation at a moderate vacuum, about 0.827 bar which compares to a value of about 0.24 bar for the case without purge.

The bulk of the steam contained in oxygen product stream 14 can be separated by condensation in a condenser 18 and separating the condensate in a water separator 19 leaving a moisture saturated pure oxygen stream. If required, the residual contained water vapor can be removed in a downstream operation by such devices as membrane or adsorption dryers. The oxygen product stream 14 can be compressed to delivery pressure in an oxygen compressor 20.

Although not illustrated, in the process outlined above, having provision for steam and fuel, oxygen separators, such as oxygen separator 2 could be converted into syngas generators. In such case fuel and possibly recycle gas would be added to the steam from waste heat boiler stream 15 to form a combined stream. The combined stream would then be introduced to the anode of the oxygen-selective ceramic membranes which would be filled with a suitable reforming catalyst, such as nickel. The permeated oxygen would react with fuel, steam and a recycle gas, such as carbon dioxide, in a combination partial oxidation-reforming reaction to create syngas. These reactions would assure high driving forces for the transport of oxygen.

Figure 3:
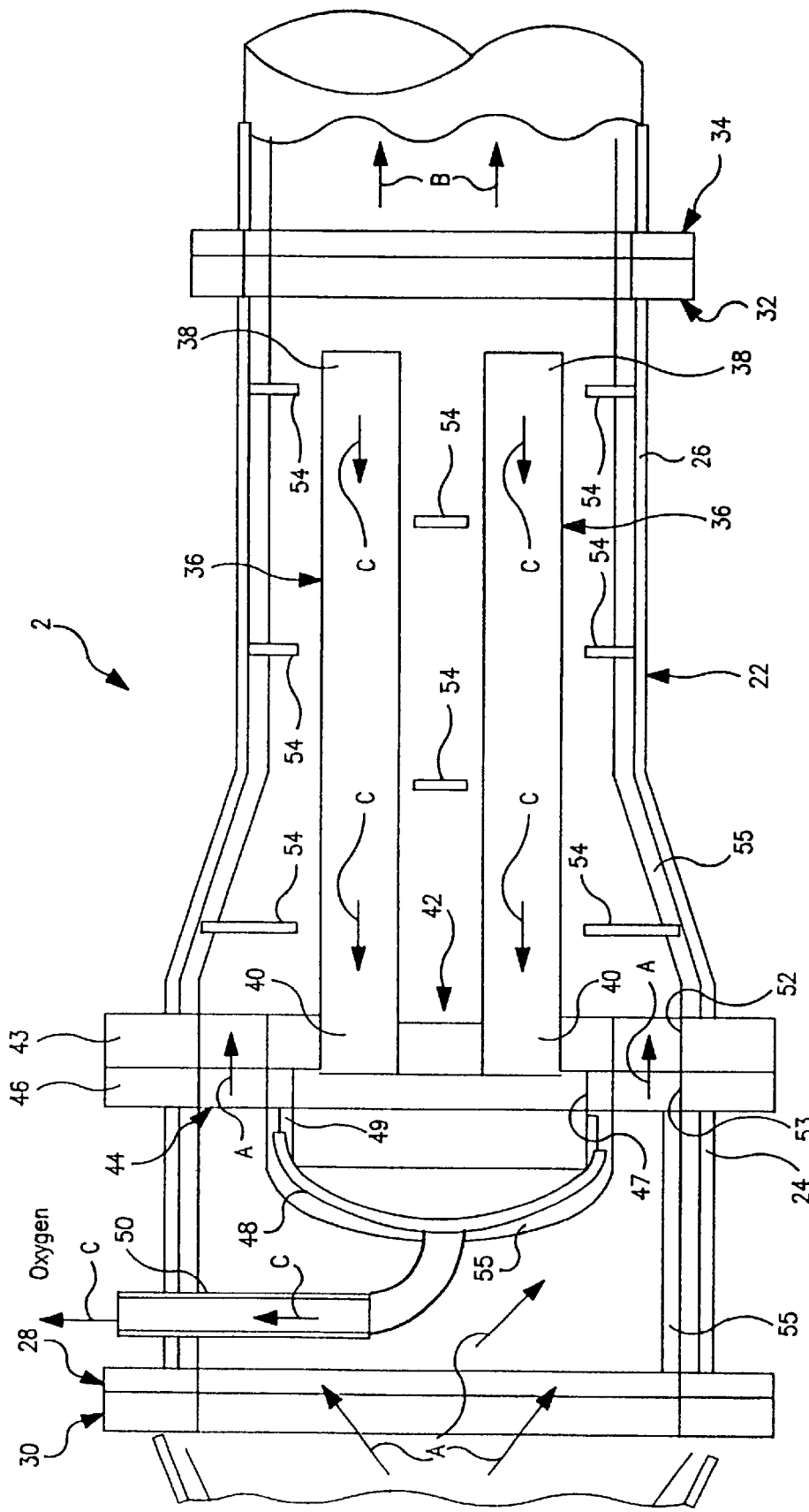
FIG. 3 is an enlarged, sectional schematic view of an oxygen separator in accordance with the present invention.

With reference to FIG. 3, an oxygen separator 2 is illustrated that is designed to be integrated into the basic system shown in FIG. 1 or the system of FIG. 2 without a steam purge. Oxygen separator 2 is provided with a duct 22 of circular, transverse cross-section that is open at opposite ends and contains sections 24 and 26. Duct 22 is connected directly to hot gas generator 1 by provision of a flange 28, connected to section 24 of duct 22, and a flange 30 connected to hot gas generator 1. As a result compressed heated oxygen containing gas "A" issuing as the expander exhaust of gas turbine 1 is received within duct 22. Duct 22 is connected to power turbine 4 at the opposite end thereof by provision of a flange 32 connected to section 26 of duct 22 and a flange 34 of power turbine 4. This allows oxygen depleted gas "B" to be directly discharged to power turbine 44. Although not illustrated, but as would be appreciated by those skilled in the art, flanges 28, 30 and flanges 32, 34 are preferably connected to one another by threaded fasteners.

A plurality of oxygen-selective ceramic membranes 36 are mounted within duct 22 for extracting the oxygen from the compressed and heated oxygen containing gas "A" to produce oxygen depleted gas "B". Each of the oxygen-selective ceramic membranes 36 is of tubular configuration and is provided with a closed end 38 and an opposite open end 40. Oxygen-selective ceramic membranes 36 are mounted within duct 22 through their connection to a tube sheet 42 that is in turn connected to section 24 of duct 22 opposite to flange 32. Open ends 40 of oxygen-selective ceramic membranes 36 are connected to a tube sheet 42 in any manner that is compatible with the materials used in fabrication. A method of sealing and attaching tubes to tube sheets comprises metallizing the outer surfaces of the oxygen-selective ceramic membranes 36 (or burner tubes that will be discussed hereinafter) at their open ends 40. The resultant metallized surfaces are brazed to one end of a double ended metallic sleeve. A metallic tube extension, at one end thereof, is brazed to the other end of the sleeve. The other end of the metallic tube extension can then be attached and sealed to the tube sheet by commonly known methods such as welding. Suitable metals are INCONEL, INCALOY, HASTELLOY and stainless steel alloys.

As a means for recovering permeated oxygen, designated by arrowheads "C", from within oxygen-selective ceramic membranes 36, a header plate 44, a cover 48, and a discharge line 50 are provided. Header plate 44 is connected to section 24 of duct 22 and is provided with an external peripheral flange 46 that connects to an external peripheral flange 43 of tube sheet 42 by threaded fasteners in a known manner. Header plate 44 has a central opening 47 to allow passage of oxygen from open ends 40 of oxygen-selective ceramic membranes 36 through header plate 44. Cover 48 is attached to an inner peripheral flange 49 of header plate 44 to form a plenum in which oxygen collects from oxygen-selective ceramic membranes 36. A discharge line 50 is connected to cover 48 and passes through sidewall of duct 22 to discharge oxygen from the duct 22.

Other means for recovering permeated oxygen could be used in oxygen separator 2 as well as in other embodiments mentioned herein. In this regard manifolds having individual connections to open ends 40 of oxygen-selective ceramic membranes 36 could be employed for such purposes. The manifolds could be located either inside or outside the duct of the particular oxygen separator.

Tube sheet 42 and header plate 44 are provided with an outer radial array of openings 52 and 53, respectively, to allow the heated oxygen containing gas "A" from gas turbine 1 to pass to oxygen-selective ceramic membranes 36 for oxygen separation. In this regard, preferably an arrangement of baffle plates, shown as a disk and doughnut type arrangement and indicated by reference numeral 54 can be provided to assure good contact of gas with the outside surfaces of oxygen-selective ceramic membranes 36 and therefore a low mass transfer resistance on the retentate gas side thereof while consuming a minimum pressure drop. Alternately segmental type baffles could be used.

Due to the high operational temperatures involved in the operation of oxygen-selective ceramic membranes 36, appropriate insulation 55 is provided on the inside surfaces of duct 22 and the cover 48.

Figure 4:
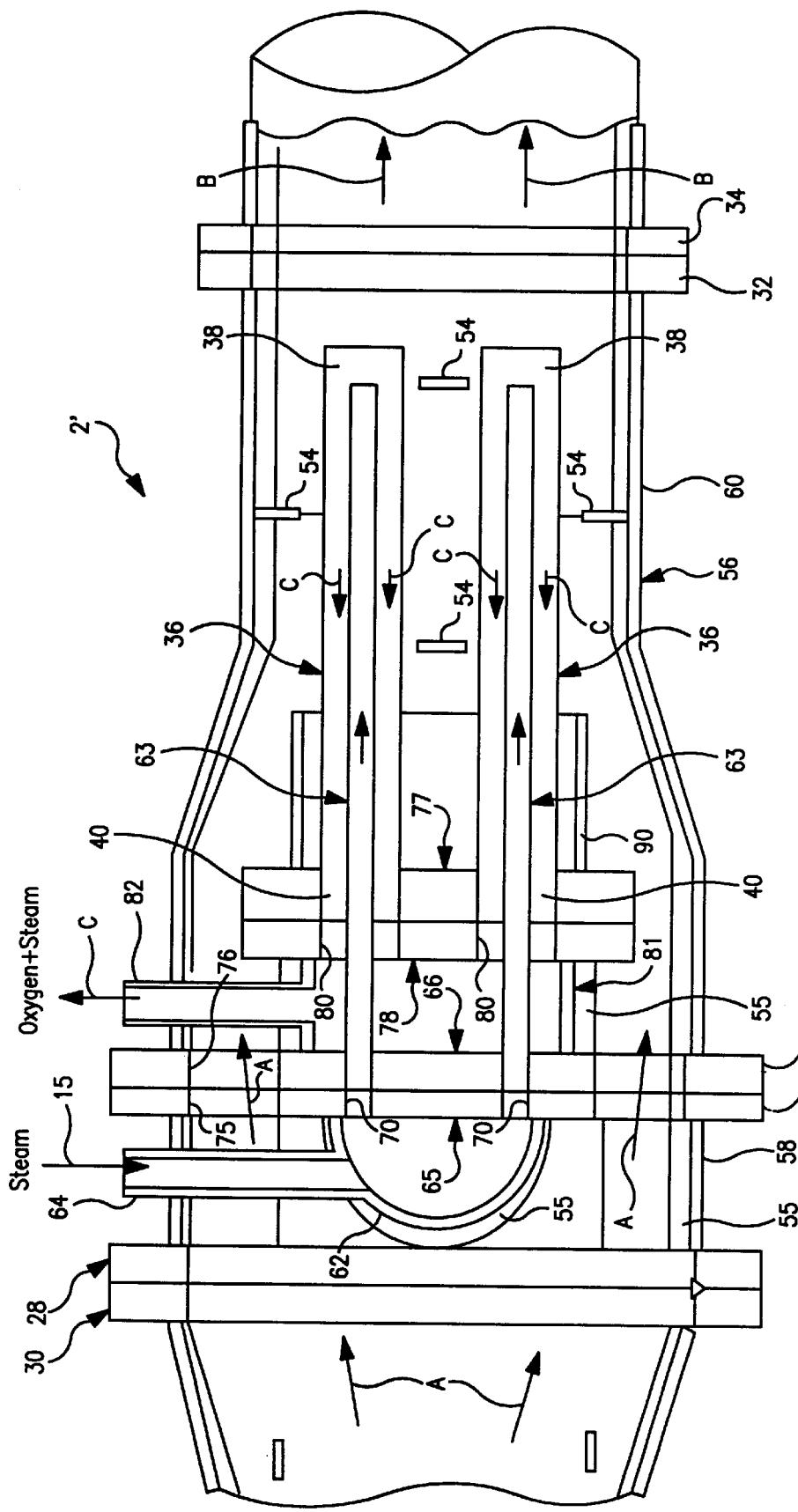
FIG. 4 is an enlarged, sectional schematic view of an alternative embodiment of an oxygen separator in accordance with the present invention having provision for stream purging.

With reference to FIG. 4, an oxygen separator 2' is illustrated that employs a steam purge in order to increase the driving force across the membrane and can be used with or without a supplemental compressed air stream. Oxygen separator 2' is designed to be integrated in the same manner as oxygen separator 2 with respect to hot gas generator 1 and power turbine 3. As illustrated, oxygen separator 2' provides a plurality of elongated tubes 63 that are coaxially located within the oxygen-selective ceramic membranes 36 for injection of steam from, for instance, waste heat boiler stream 15, to purge oxygen from within the membranes 36.

Oxygen-selective, ion conducting membranes 36 are mounted within a duct 56 made up of sections 58 and 60. A cover 62 is provided to form a steam plenum. The steam plenum is in communication with elongated tubes 63 and a steam inlet line 64 that passes through section 58 of duct 56. This allows steam to be introduced into the elongated tubes 63. Cover 62 is connected to a header plate 65 which is in turn connected to a tube sheet 66. Elongated tubes 63 are connected to tube sheet 66. Header plate 65 is provided with an array of openings 70 in alignment with elongated tubes 63 to allow steam to pass through header plate 65 and into elongated tubes 63. Header plate 65 and tube sheet 66 are connected to sections 58 and 60, respectively and are in turn connected to one another by peripheral flanges 72 and 74. Radial and peripheral arrangements of openings 75 and 76 defined within header plate 65 and tube sheet 66, respectively, are provided to allow hot oxygen containing gas to flow towards oxygen-selective, ceramic membranes 36.

A tube sheet 77 is provided for mounting oxygen-selective ceramic membranes 36. Tube sheet 77 is connected to a header plate 78 having openings 80 aligned with open ends 40 of oxygen-selective ceramic membranes 36 to allow oxygen to pass through header plate 78. The oxygen collects within a cover 81 which is of cylindrical configuration and is connected at opposite ends to header plate 78 and tube sheet 66 to support the foregoing assemblage of membrane, tube sheet and header plate from tube sheet 66 and to form an oxygen plenum within cover 81. An oxygen discharge line 82 is connected to cover 81 and extends through section 60 of duct 56 to allow oxygen and steam to be discharged.

Figure 5:
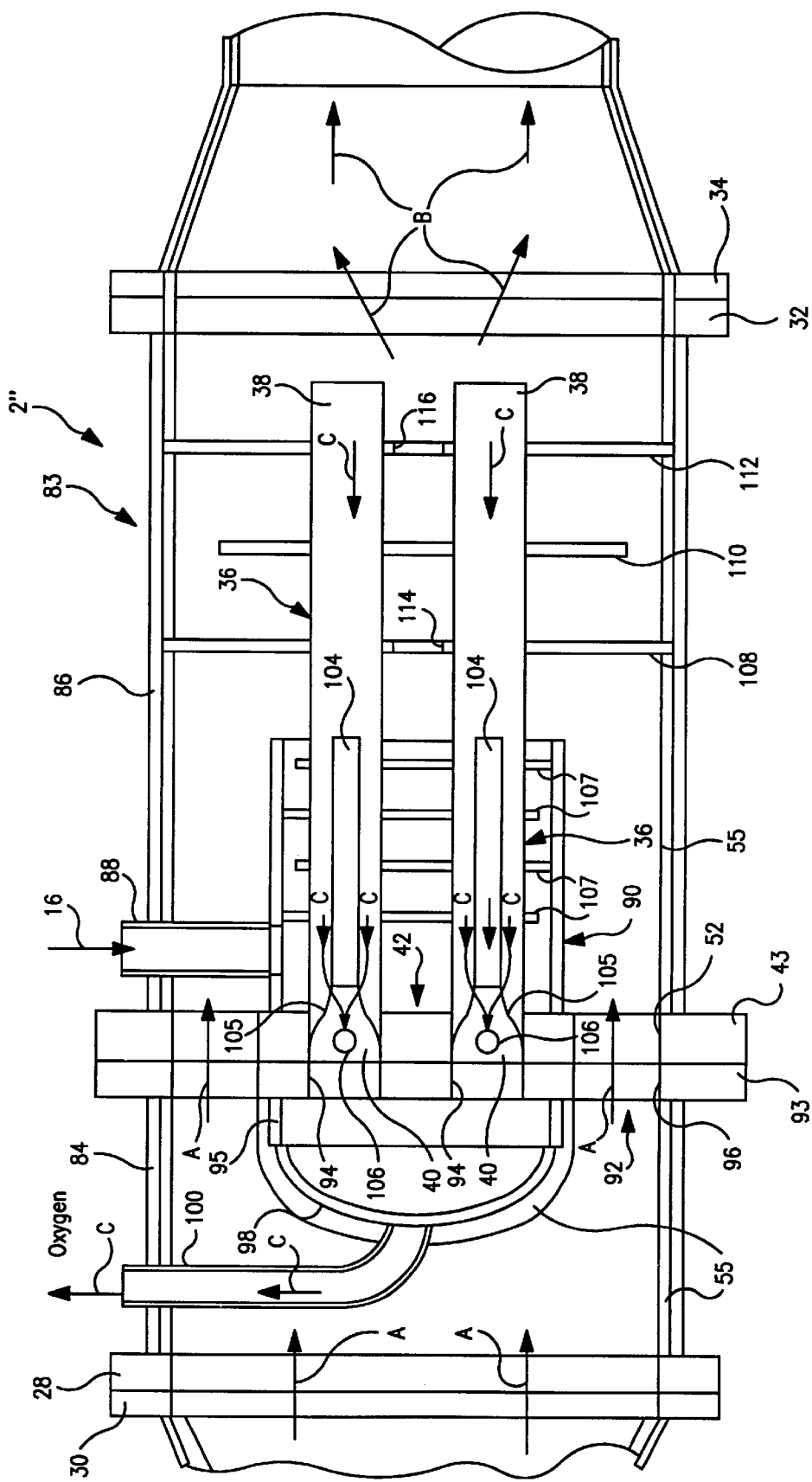
FIG. 5 is an enlarged, sectional schematic view of an alternative embodiment of an oxygen separator in accordance with the present invention having provision for oxygen product cooling while heating cool supplementary air.

With reference to FIG. 5, an oxygen separator 2" is illustrated that is designed to be integrated with hot gas generator 1 and power turbine 3 in the same manner as oxygen separator 2 with the use of supplemental compressed feed air stream 16.

Oxygen separator 2" is provided with a duct 83 made up of sections 84 and 86. A supplemental cool air inlet 88 is provided to inject cool air. The cool air acts to cool permeated oxygen and the associated supporting structure for oxygen-selective ceramic membranes 36.

Supplemental cool air inlet 88 passes through section 86 of duct 83 and is connected to a shroud 90. Shroud 90 is connected to tube sheet 42 along with oxygen-selective ceramic membranes 36. Tube sheet 42 is in turn connected to a header plate 92 having an inner radial array of openings 94 aligned with ends 40 of oxygen-selective ceramic membranes 36 and an outer radial array of openings 96 aligned with openings 50 of tube sheet 42.

Header plate 92 is also provided with an inner flange 95 of cylindrical configuration and surrounding inner radial array of openings 94. A cover 98 is connected to inner flange 95 to form an oxygen plenum in which oxygen "C" from oxygen-selective ceramic membranes 36 collects. Oxygen "C" is discharged from such oxygen plenum through a discharge line 100 passing through section 84 of duct 83. It is to be noted that tube sheet 42 and header plate 92 are connected by peripheral flanges 43 and 93, respectively, to also connect sections 84 and 86 of duct 83.

Compressed, heated oxygen containing gas "A" from the exhaust of gas turbine 1 thus passes through outer radial arrays of openings 96 and 50 to conduct heated oxygen containing gas to ceramic membranes 36 downstream of shroud 90. At the same time cool air injected into shroud 90 contacts oxygen-selective ceramic membranes 36 to cool oxygen permeate flowing therein, portions of oxygen-selective ceramic membranes 36 surrounded by shroud 90 and therefore, such supporting structures as tube sheet 42 and header plate 92, is heated to an elevated temperature.

The shroud 90 therefore divides oxygen-selective ceramic membranes 36 into heat exchange sections and separator sections. The oxygen-selective ceramic membranes 36 used for this embodiment can be formed of a porous substrate having one or more porous layers. A dense electrolyte film is deposited onto the substrate in the separator sections. A dense seal coat, either ceramic or metallic, is deposited in the heat exchange sections.

In order to increase the heat transfer coefficients on the outside of tubes an internal arrangement of baffles 107, shown as of the segmental type, may be provided within shroud 90. Further, a plurality of tube-like sleeves 104 can be provided within oxygen-selective ceramic membranes 36 creating a narrow flow annulus and thereby improving heat transfer film coefficients between the oxygen permeate flowing therewithin and the tube wall. Sleeves 104 are connected to open ends 40 of oxygen-selective ceramic membranes 36 by provision of conical-like structures 105 having openings 106 to allow oxygen permeate to enter conical-like structures 105.

Additionally, an external arrangement of disk and doughnut type baffles 108, 110, and 112 having openings 114 and 116 may be provided to increase the mass transfer between the heated air and oxygen-selective ion conducting membranes 36. More than one set of baffles may be installed.

Figure 6:
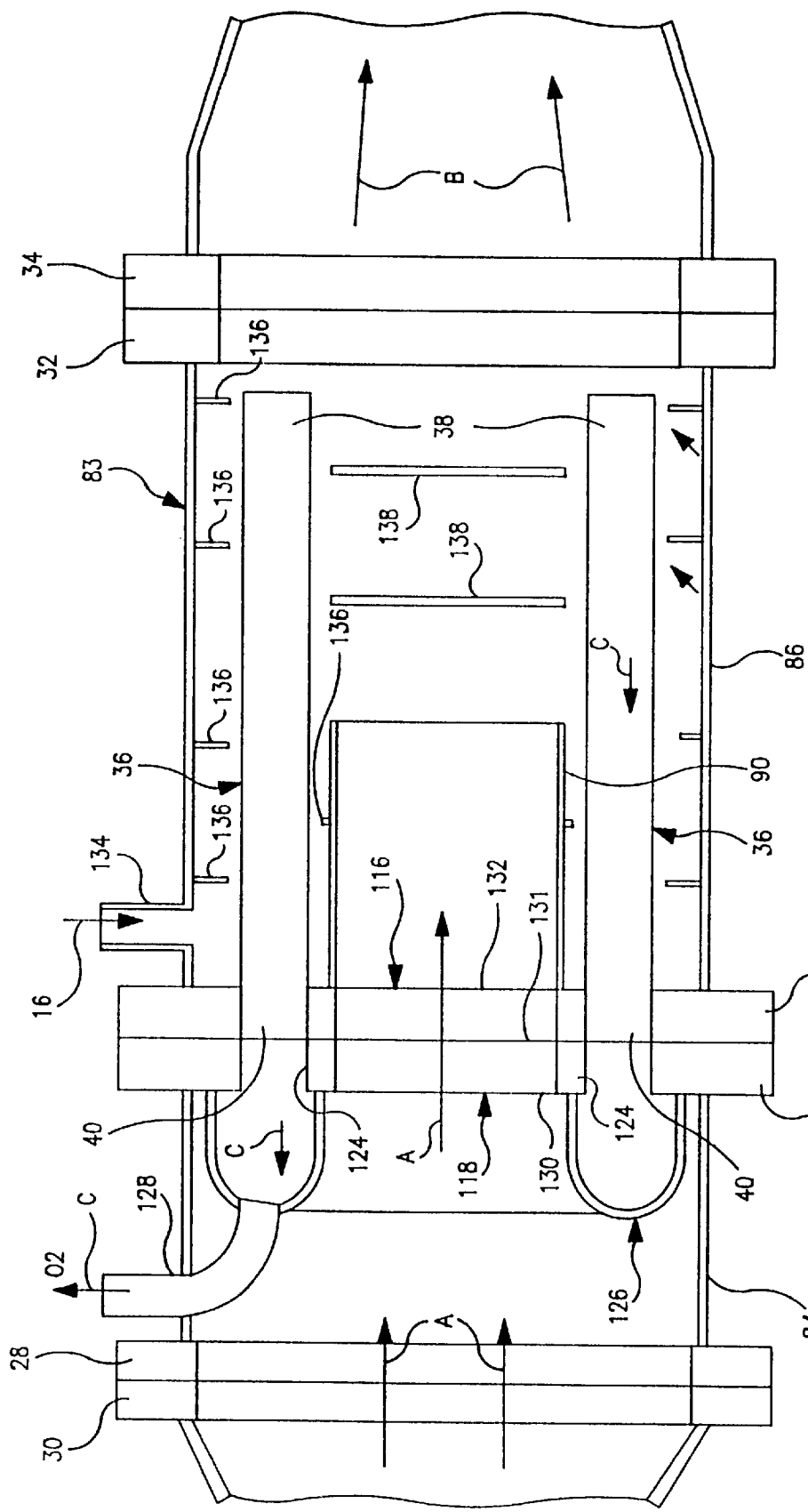
FIG. 6 is an enlarged, sectional schematic view of an alternative embodiment of an oxygen separator in accordance with the present invention having provision for oxygen product cooling.

With reference to FIG. 6, an oxygen separator 2''' is illustrated as another alternate embodiment to oxygen separator 2' illustrated in FIG. 5. In such embodiment, the flow of heated oxygen containing gas "A" from expander 12 is axial and therefore the heated oxygen containing gas "A" flows inside shroud 90.

Shroud 90 is connected to a tube sheet 116 which is in turn connected to a header plate 118 by outer peripheral flanges 120 and 122, respectively, that thereby also connect sections 84 and 86 of duct 83. Oxygen-selective ceramic membranes 36 are connected to tube sheet 116 and header plate 118 is provided with an array of openings 124 aligned with open ends 40 of oxygen-selective ceramic membranes 36 for the passage of the oxygen "C". An annular cover of toroidal shape 126 is connected to header plate 118 to form an oxygen plenum to collect the oxygen "C". A discharge line 128 discharges the oxygen from the oxygen plenum and section 84 of duct 83.

Annular cover 126, header plate 118, and tube sheet 116 are each of annular configuration and thus, are provided with central openings 130, 131, and 132 aligned with one another and shroud 90 to allow for the axial passage of heated air downstream of cooling air that is supplied by a cool air inlet 134. Outer and disk and doughnut type baffles 136 may be provided to increase heat transfer film coefficients on the cooling air side within the heat transfer section and central disk and doughnut baffles 138 may be provided to increase the mass transfer between the hot air and the oxygen-selective ceramic membranes 36 in separator section.

Figure 7:
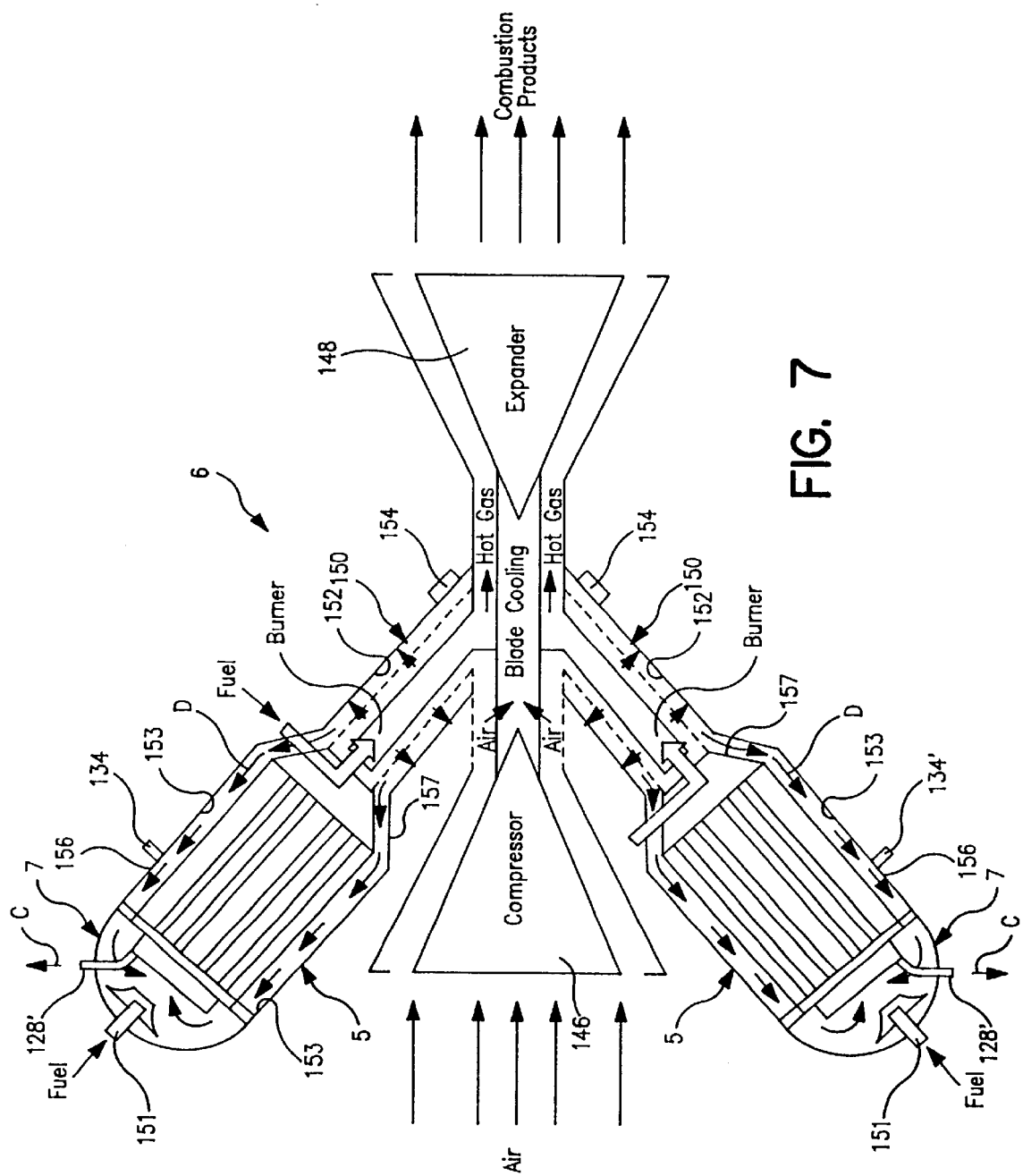
FIG. 7 is a schematic view of an integration of an oxygen separator in accordance with the present invention with a burner of a gas turbine.

FIG. 7 shows an integration of oxygen separator 5 integrated with a large-scale industrial gas turbine 6 of the type that would be used in an IGCC process. Gas turbine 6 is provided with a compressor 146 driven by an expansion turbine or expander 148. Fuel is burned in combustors or burners 150 to heat compressed air produced by the compressor 146 to form compressed and heated air to drive the expander 148. Expander 148 normally produces additional shaft work that is used to generate electricity through a generator or a compressed gas through a separate compressor.

Oxygen separators 5 are connected to burners 150. Pre-burners 7, connected to oxygen separator 5, have fuel injectors 151 to produce the heated oxygen containing gas "A" in the form of heated air for separation of oxygen therefrom in oxygen separators 5. The air supplied to pre-burners 7 is compressed air transferred from compressor 146 along annular passages 152 in burners 150 and annular passages 153 in oxygen separator 5 or a combination of air formed from the discharge of compressor 146 and air processed in a separate compressor. The air from the separate compressor can be added directly to annular passages 152 through nozzles 154. Although not illustrated, such separately compressed air could be added directly to pre-burners 7.

From 5% to 20% of the air compressed in compressor 146 is sent directly to expander 148 for cooling, and from 10% to about 80% of the air compressed by compressor 146 is transferred to pre-burner 7. The remaining air is fed directly to the burners 150. The separation of oxygen in oxygen separator 5 produces oxygen depleted gas "B" that is introduced into burners 150. Although not illustrated, oxygen separators 5 could be connected between burners 150 and gas turbine 6 so as to receive heated oxygen containing gas "A" directly from burners 150. In such case the oxygen depleted gas "B" would be directly discharged to gas turbine 6 and there would be no pre-burner 7.

Figure 8:
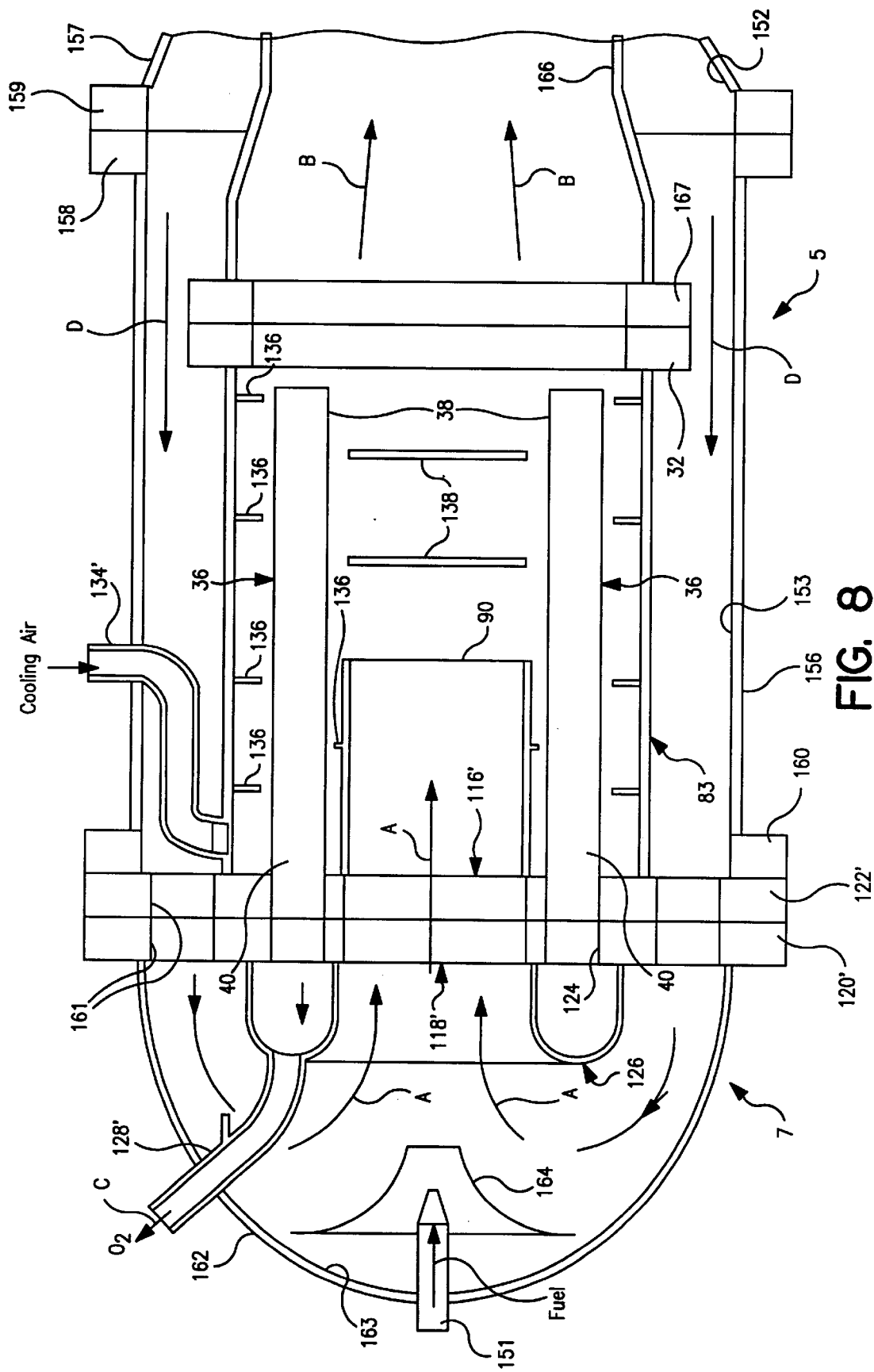
FIG. 8 is an enlarged, fragmentary sectional schematic view of an oxygen separator in accordance with the present invention showing an integrated burner for use with the integration shown in FIG. 7.

FIG. 8 illustrates separator 5 which is an adaptation of the design of separator 2''' of FIG. 6. The interior assembly of separator 5 is virtually identical to that separator 2''' with modifications for service with gas turbine 6. Oxygen separator 5 differs from separator 2''' by the addition of annular passage 153 defined between the walls of duct 83 and an outer duct 156 and the replacement of section 84 of duct 83 by pre-burner 7. Additionally, an extended discharge line 128' and an extended cool air inlet 134' are provided to penetrate pre-burner 7 and outer duct 156. It is to be noted that embodiments of the present invention are possible in which pre-burner 7 is formed by a separate device that while being connected to the oxygen separator is not integral therewith as in the illustrated embodiment of oxygen separator 5.

Outer duct 156 is attached to a transition piece 157 of duct work leading from gas turbine 6 by flanges 158 and 159. An enlarged header plate 118' and an enlarged tube sheet 116' are provided for attachment of pre-burner 7 to oxygen separator 5. Header plate 118' and tube sheet 1161 are in turn attached to a flange 160 connected to outer duct 156.

A radial array of openings 161 are provided in header plate 118' and tube sheet 116' for the passage of compressed oxygen containing gas "D" from the turbine assembly. Pre-burner 7 is provided with a shaped head 162 of dome-like configuration attached to the outer flange 120' of header plate 118' to form a return manifold space 163. Fuel injection nozzle 151 penetrates shaped head 162 to inject fuel to react with a portion of the oxygen in compressed oxygen containing gas "D" thereby raising the temperature of compressed oxygen containing gas "D" to form heated oxygen containing gas "A" having a sufficient temperature for effective oxygen ion transfer. A curved annular ring baffle 164 is provided to help reverse the flow of compressed oxygen containing gas "D" within shaped head 162. Oxygen depleted gas flow "B" is returned to the turbine via concentric inner duct 166. Concentric inner duct 166 is connected to a flange 167 that is in turn connected to flange 32 of duct 83.

Figure 9:
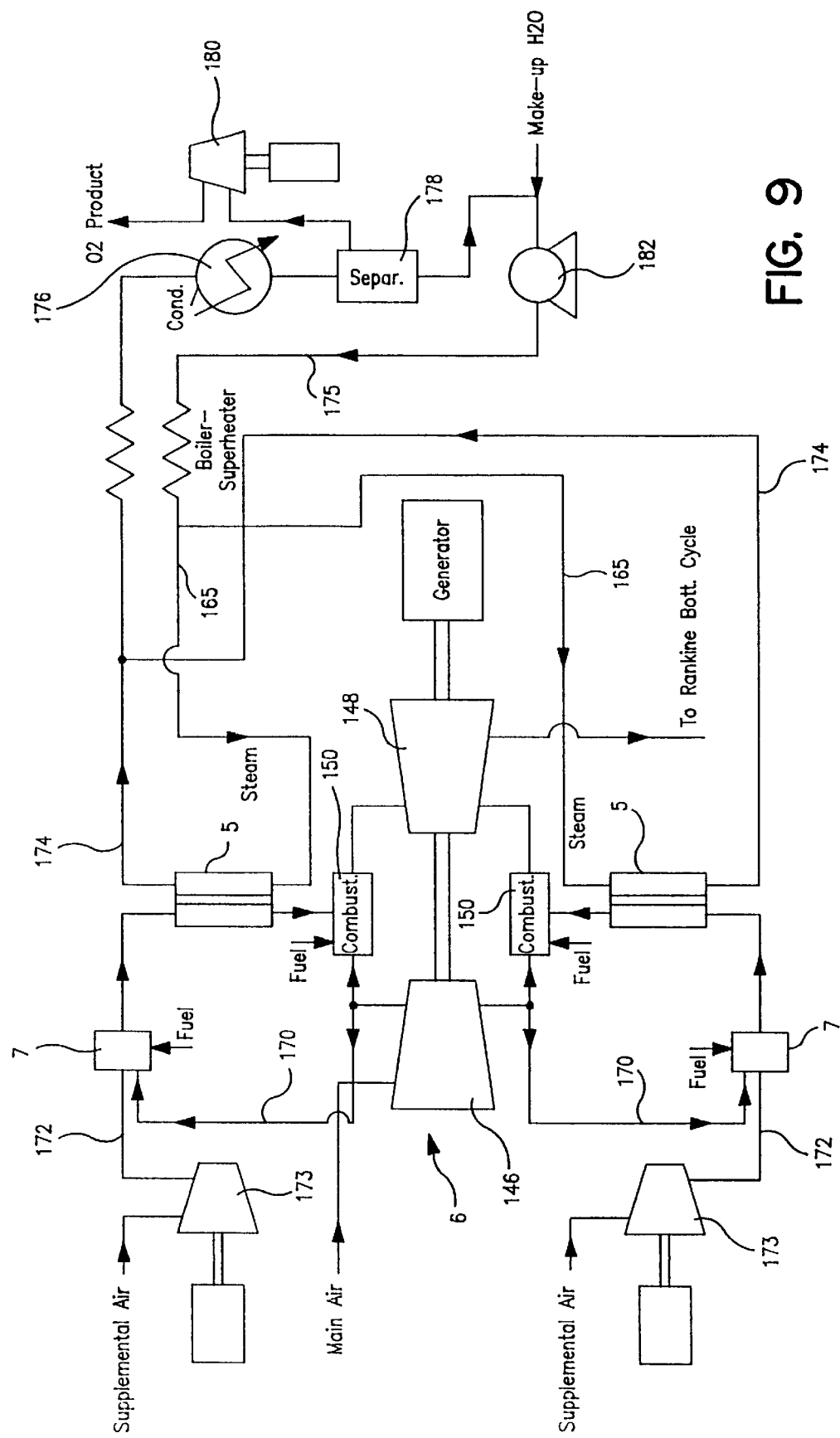
FIG. 9 is a schematic of a process flow diagram of the integration shown in FIG. 7 with an optional supplemental, compressed feed air stream and stream purging.

With reference to FIG. 9, a process flow diagram is illustrated for the integration of oxygen separators into gas turbine 6 for the type of system shown in FIG. 7. The oxygen separator design used in such system incorporates the feature of oxygen separator 21 shown in FIG. 4 with the addition of an outer duct (such as outer duct 156 of oxygen separator 5) and a pre-burner connected to the outer duct in the same manner as the connection of pre-burner 7 to outer duct 156 of oxygen separator 2. Although only two oxygen separators are shown, it is understood that the integration would involve multiple oxygen separators connected to multiple burners 150 distributed around the periphery of a connecting duct between the compressor 146 and the expansion turbine 148.

The extracted from the gas turbine compressor discharge as bleed air stream 170. A compressed, supplemental feed air stream 172 is provided by separate air compressors 173 and mixed with compressed bleed air stream 170. Although not illustrated, this can be done in a pre-burner, such as pre-burner 7, by the addition of a supplementary air inlet within shaped head 162. As may be appreciated, a single compressor could feed all of the oxygen separators 5. The retentate streams from the oxygen separators 5 consisting of oxygen depleted air "B" can be mixed with fuel either in the burners 150 as indicated in the figure or prior to entering the burners (not shown).

Oxygen product streams 174 formed of permeated oxygen can be cooled through indirect heat exchange with a stream 175 used to raise steam. Thereafter, oxygen product streams 174 can be cooled further in a condenser 176 to condense out water which thereafter is separated in a separator 178. Oxygen product streams 174 can then be compressed to delivery pressure with an oxygen compressor 180.

To attain high oxygen recovery in oxygen separators 5, the potential exists that the permeated oxygen will be extracted at a vacuum level. In order to avoid this and deliver oxygen to oxygen compressor 180 at a somewhat elevated pressure, steam introduced by way of stream 165, is employed as a sweep gas for oxygen separators 5. It is to be noted that the water to produce stream 175 consists of water separated out of oxygen product stream 174 and make-up water that is pumped by a pump 182 to oxygen separators 5.

For a typical modern gas turbine, which compresses the feed air to about 13.8 to 31.05 bar, the quantity of purge steam, thus generated, is sufficient to achieve oxygen recovery levels of about 80 percent of the amount contained in the feed air to oxygen separators 5 and to deliver oxygen to oxygen compressor 182 at about 1.72 bar, while maintaining adequate driving potentials for oxygen transport in oxygen separators 5.

To maintain the power generation, the supplemental air of supplemental compressed feed air stream 172 fed to oxygen separators 5 should be at least equal to the oxygen volume withdrawn. Ideally one separator module should be associated with each combustor on the gas turbine. If maximum power production is desired from a given installation multiple compression stages with intercooling can be used since the power required for compressing the supplemental compressed feed air stream 172 (if it is equal in volume to the oxygen volume permeated) is a power penalty to the system. However in most instances the overall efficiency of the cycle will be less with intercooling than without it.

Figure 10:
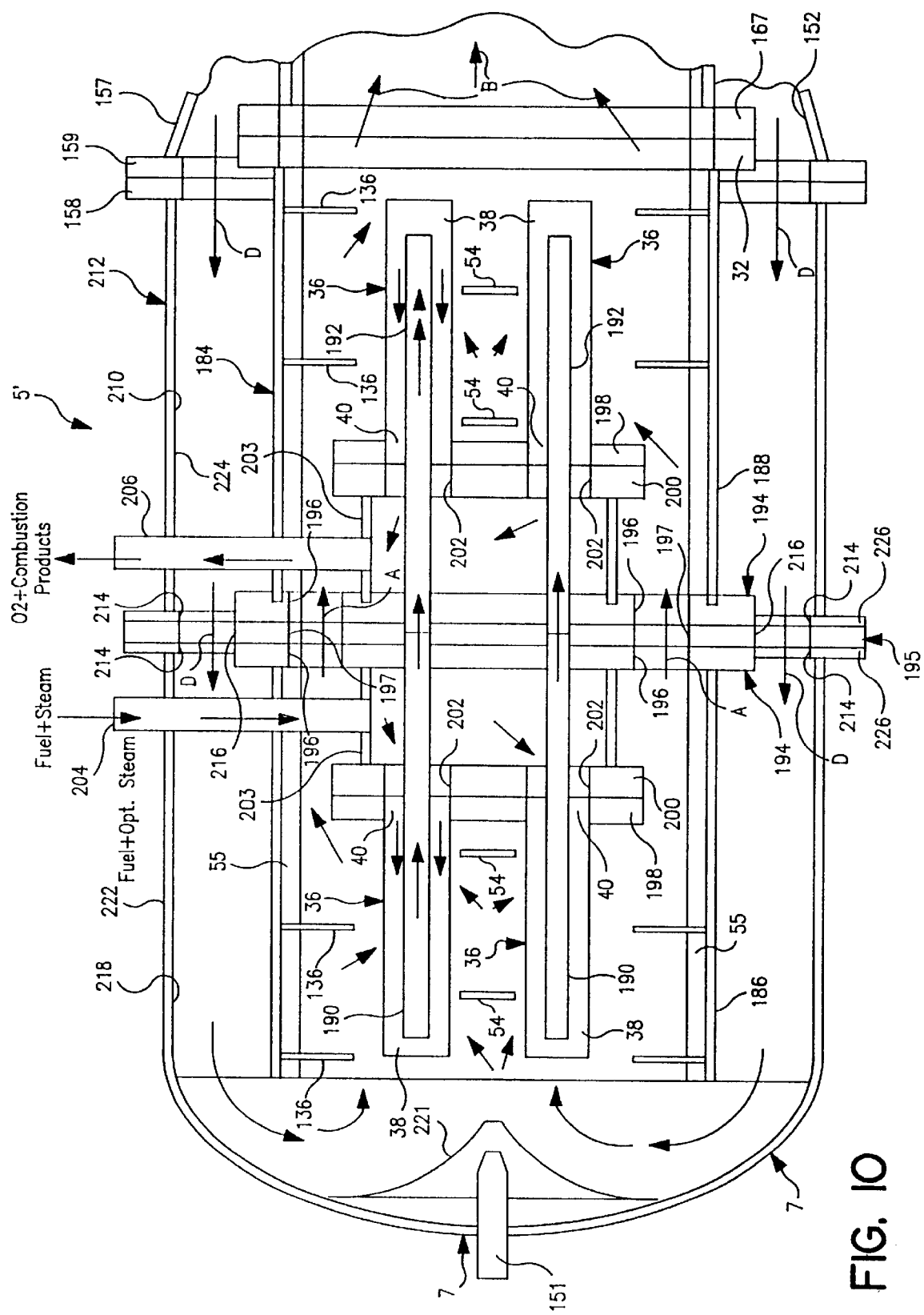
FIG. 10 is an enlarged, sectional schematic view of an alternative embodiment of an oxygen separator in accordance with the present invention for use within the integration shown in FIG. 7.

With reference to FIG. 10, an oxygen separator 5' is illustrated that can be integrated in the manner specifically illustrated in FIG. 7 without pre-burner 7 continuously operating.

Oxygen separator 5' is provided with an inner duct 184 that includes a combustion section 186 and a separator section 188. Oxygen-selective ceramic membranes 36 located within combustion section 186 of inner duct 184 function as burner tubes for the combustion of fuel or optionally a mixture of fuel and steam. Such combustion is supported by oxygen permeate extracted from the hot gas. The combustion heats air passing through inner duct 184 to allow oxygen-selective ceramic membranes to function as their designed operational temperatures. Pre-burner 7 is therefore only to be used for start-up purposes in case of an integration between a pre-burner 7 and burner 150. Oxygen-selective ceramic membranes located within separator section 188 of duct 184 function to separate oxygen from the heated air that forms heated oxygen containing gas "A".

Combustion section 186 of inner duct 184 has a plurality of elongated tubes 190 that are coaxially located within the oxygen-selective ceramic membranes 36. Separator section 188 of duct 184 is also provided with a plurality of elongated tubes 192 that are in communication with elongated tubes 190 and that are coaxially located within the oxygen-selective ceramic membranes 36. Elongated tubes 192 receive combustion products from elongated tubes 190 to purge oxygen from within the oxygen-selective ceramic membranes 36 located within separator section 188.

Combustion and separator sections 186 and 188 of inner duct 184 and their internal components are a mirror image of one another though they may employ oxygen-selective ceramic membranes 36 of different length. Typically oxygen-selective ceramic membranes 36 within separator section 188 will be longer than those within combustion section 186.

In combustion and separator sections 186 and 188 of inner duct 184, elongated tubes 190 and 192 are connected to a pair of tube sheets 194 that are in turn connected to a central mounting plate 195. Tube sheets 194 have peripheral flanges connected to one another by for instance, threaded fasteners (not shown), to also connect combustion and separator sections 186 and 188 to one another. Tube sheets 194 and central mounting plate 195 are also provided with outer, radial arrays of aligned openings 196 and 197, respectively, to permit hot oxygen containing gas "A" to pass from combustion section 186 to separator section 188.

A pair of tube sheets 198 are provided for mounting oxygen-selective ceramic membranes 36. Tube sheets 198 are connected to header plates 200 having openings 202 aligned with open ends 40 of oxygen-selective ceramic membranes 36. A pair of covers 203 of cylindrical configuration connect header plates 200 to tube sheets 194 to form plenums. The plenums allow fuel and optionally steam to be introduced into oxygen-selective, ion conducting membranes 36 that function as burner tubes and to collect oxygen and combustion products including moisture and carbon dioxide from oxygen-selective ceramic membranes 36 that function solely as separators. Appropriate heat transfer means, such as those illustrated within U.S. Pat. No. 5,820, 654, which is hereby incorporated by reference as if fully set forth herein, are preferably employed to prevent either overheating or quenching of the reaction.

A fuel inlet line 204 and an outlet line 206 penetrate combustion and separator sections 186 and 188, respectively, and communicate with the plenums formed by covers 203. Fuel and optionally steam is introduced into fuel inlet line 204 and permeated oxygen and combustion products including moisture and carbon dioxide and any steam is discharged from outlet line 206. The carbon dioxide can be recovered as a separate product by any one of a number of processes well known in the art.

The compressed oxygen containing gas "D" is supplied from the compressor discharge through the annular space 210 defined between outer duct 212 and separator section 188 of inner duct 184. The oxygen containing gas "D" flows through radial openings 214 and 216 defined in header plates 194 and central mounting plate 195, respectively, and then through the annular space 218 defined between outer duct 212 and combustor section 186 of inner duct 184. The flow is turned 180 degrees by baffles 221 and then enters the interior of combustor section 186. As illustrated, outer duct 212 is formed of two sections 222 and 224 that are attached to outer flanges 226 of header plates 194. Outer flanged portions 226 are in turn connected to central mounting plate 195.

Although the present invention has been illustrated with reference to oxygen separators that employ oxygen-selective ceramic membranes oriented in line with the flow of heated oxygen containing gas "A", the present invention should not be construed as limited to such embodiments. For instance, with reference to FIG. 11, an alternative embodiment of oxygen separator 2" is illustrated with oxygen-selective ceramic membranes 36 being oriented at right angles to the flow within a duct 230. Oxygen-selective ceramic membranes 36 are connected to a tube sheet 232 that is in turn connected to a header plate 234. An upright structure 236 having a similar configuration to shroud 90 is connected to duct 230. Circular flanges 238 and 240 are attached to duct 230 and upright structure 236, respectively, and to each other by fasteners, not shown.

Upright structure 236 functions to receive the cooling air 16 to cool oxygen permeate flowing within oxygen-selective ceramic membranes 36, portions of oxygen-selective ceramic membranes 36 surrounded by upright structure 236 and therefore, such supporting structures as tube sheet 232 and header plate 234. Thereafter, stream 16 having been heated by heat exchange with hot oxygen, joins heated oxygen containing air "A" from hot gas generator 1 to be separated within portions of oxygen-selective ceramic membranes 36 projecting into duct 230. In this regard, duct 230 is connected directly to gas turbine 1 by provision of a flange 242 and to power turbine 4 at the opposite end thereof by provision of a flange 244.

The following is a calculated example of integrations of oxygen separator 2 with hot gas generator 1.

EXAMPLE

In a calculated example for an aircraft derivative version of gas turbine 1, comparisons are presented between the standard Case I for power production only, a Case II with oxygen co-production by an integrated oxygen separator 2 with vacuum pumping, and a comparative Case III with an oxygen separator 2' purged by steam to produce oxygen at above atmospheric pressure. The steam is generated by extracting heat from the power turbine waste gas. The cycle shown in FIG. 2 (with supplemental air) was used for the oxygen producing cases. A Case IV for a nonintegrated cryogenic plant and separate power plant is added for comparison.

The following were key assumptions:
Hot gas generator compressor pressure ratio: 30
Hot gas generator compressor: non-intercooled
Suppl. Air compressor: 2 stages w. intercooling
$O_2$ vacuum pump 3 stages w. intercooling
Air compressor efficiencies: 80%
Turbine efficiency: 90%
Oxygen vacuum pump efficiency: 70%
Fuel: Methane
$O_2$ Product: at 1.0135 bar
The following are the Computed Results:
Hot gas pressure: 6.32 bar
Hot gas temperature: 1154 K
Power turbine outlet temp. 761K

| UNITS | Net Power (KW) | $O_2$Product $M^3$(STP)/Hr | Fuel $M^3$(STP)/Hr | Heat Rate (based on LHV) KW/KWHr |
|---|---|---|---|---|
| Case I | 20,000 | — | 4.49 | 2.256 |
| Case II | 18,650 | 7,150 | 4.52 | 2.432 |
| Case III | 19,210 | 7,150 | 4.55 | 2.375 |
| Case IV | 17,500 | 7,150 | 4.49 | 2.577 |

The above table illustrates that the integrated OTM cases save a significant amount of power over a separate cryogenic plant. The steam purged case saves oxygen compressor power and investment at the expense of added investment in steam generating equipment and heat exchangers. The case assumes that there is no competing use for the waste heat.

Figure 11:
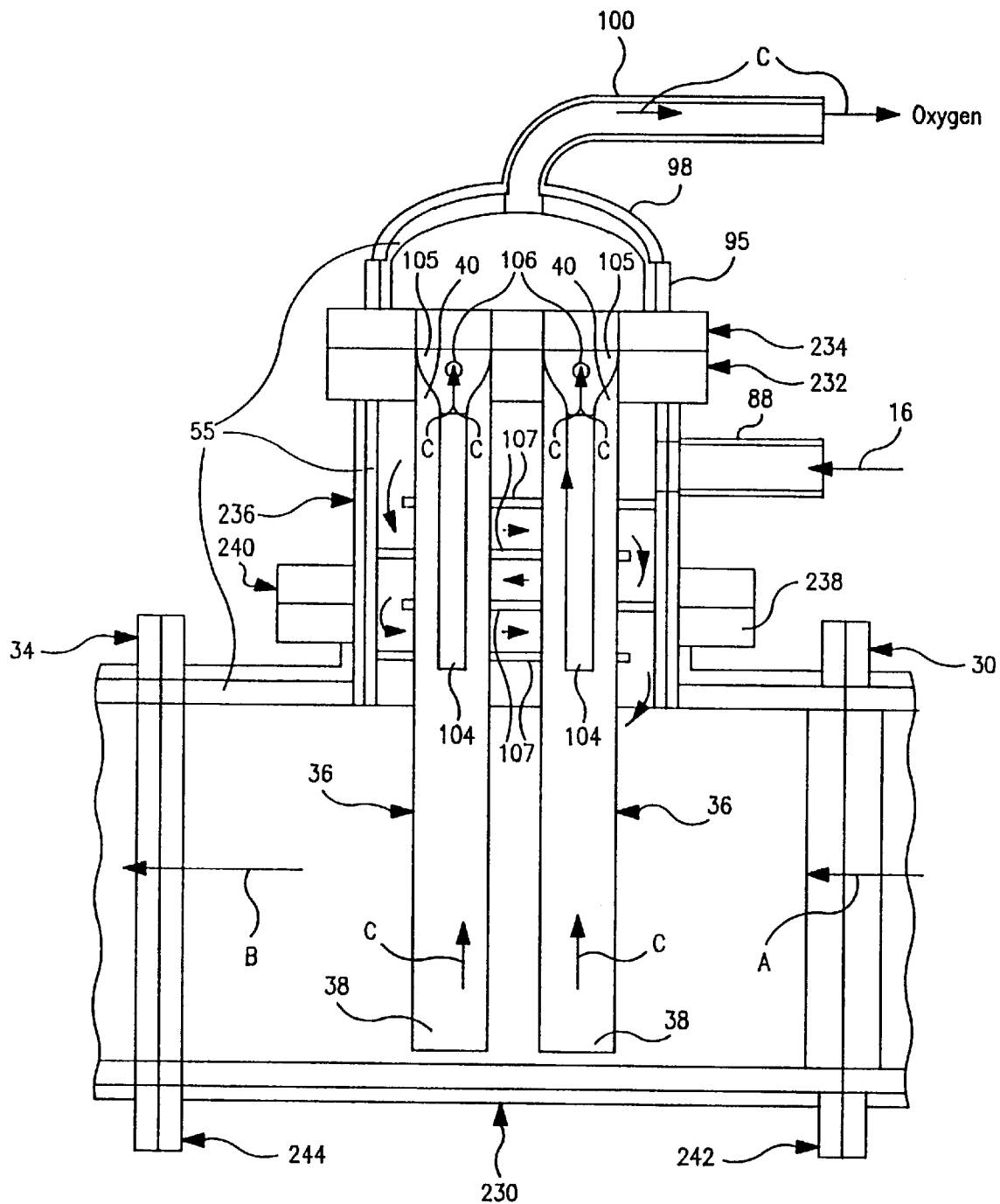
FIG. 11 is an alternative embodiment of the oxygen separator shown in FIG. 6.

If one assumes an average oxygen flux in the OTM separator of 8.49 $m^3$ (STP)/Hr$m^2$, the separator area would be 84.236 $m^2$. For 3.66 m long, 2.54 cm diameter tubes spaced at a 3.49 cm pitch, the bundle diameter would be about 2.06 m. Leaving about 0.76 m for insulation and peripheral flow area would result in a outside shell diameter of about 2.9 m. If the annular arrangement of FIG. 11 is employed with a 1.22 m diameter internal flow area, the outer bundle diameter would be about 2.36 m. This would result in a shell diameter of about 2.74 m.

While the present invention has been described with reference to a preferred embodiment, as will occur to those skilled in the art, numerous changes, additions and omissions may be made without departing from the spirit and scope of the present invention.

What is claimed is:

1. An oxygen separator for separating oxygen from compressed air flowing to a burner of a gas turbine, said oxygen separator comprising:

an elongated duct open at opposite ends and configured to be connected to and mounted on said burner of said gas turbine to receive heated oxygen containing gas formed from the compressed air after having been heated and to discharge an oxygen depleted gas;

a plurality of oxygen-selective ceramic membranes for extracting said oxygen from said heated gas;

said oxygen-selective ceramic membranes mounted within said duct so that said oxygen separates from said heated oxygen containing gas and collects within said oxygen-selective ceramic membranes and an external flow of said oxygen depleted gas forms within said duct; and means for recovering said oxygen from said oxygen-selective ceramic membranes.

2. The oxygen separator of claim 1, wherein:

a pre-burner heats the compressed air; and said duct is directly mounted between said pre-burner and said burner of said gas turbine.

3. The oxygen separator of claim 2, wherein:

said duct is an inner duct;

an outer duct, surrounding said inner duct and connected to said pre-burner defines an annular space between said inner and outer ducts to transfer the compressed air to the pre-burner.

4. The oxygen separator of claim 2, wherein each of said oxygen-selective ceramic membranes is of elongated, tubular configuration having closed ends and opposite, open ends;

said recovering means recover said oxygen from said open ends of said oxygen-selective ceramic membranes;

a plurality of burner tubes are fabricated from a ceramic permeable to said oxygen for separation of said oxygen from said heated gas;

a fuel inlet line passes through said duct for introduction of fuel;

a fuel chamber is in communication with said burner tubes and connected to said fuel inlet line for introducing said fuel into said burner tubes for burning in the presence of said oxygen to heat said compressed air and to produce combustion products; and transfer tubes are coaxially located within said oxygen-selective ceramic membranes and said burner tubes for transfer of said combustion products from said burner tubes to said oxygen-selective ceramic membranes, thereby to provide a sweep gas for said oxygen-selective ceramic membranes.

5. The oxygen separator of claim 1, wherein:

each of said oxygen-selective ceramic membranes is of elongated, tubular configuration having closed ends and opposite, open ends; and said recovering means recover said oxygen from said open ends of said oxygen-selective ceramic membranes.

6. The oxygen separator of claim 5, further comprising:

a plurality of elongated tubes coaxially located within said oxygen-selective ceramic membranes for injection of steam to purge said oxygen from within said membranes;

a steam plenum in communication with said elongated tubes; and a steam inlet line passing through said duct and connected to said steam plenum for introduction of said steam.

7. The oxygen separator of claim 6, further comprising a plurality of tube-like sleeves mounted within said oxygen-selective ceramic membranes thereby creating a narrow flow annulus to improve a heat transfer film coefficient between the oxygen flowing within said oxygen-selective ceramic membranes and the tube walls of said ceramic membranes.

8. The oxygen separator of claim 5, further comprising:

a shroud surrounding a portion of said oxygen-selective ceramic membranes; and a supplemental cool air inlet passing through said duct and connected to said shroud for introduction of cool air to cool said oxygen within said oxygen-selective ceramic membranes and structure supporting said oxygen-selective ceramic membranes while being heated to an elevated temperature.

9. The oxygen separator of claim 5, wherein:

said oxygen-selective ceramic membranes are mounted within said duct through connection to a tube sheet that is in turn connected to said duct; and said oxygen recovering means comprises, a header plate connected to said tube sheet and having at least one opening to allow passage of said oxygen from the open ends of said oxygen-selective ceramic membranes through said header plate, a cover connected to said header plate and covering said at least one opening, and a discharge line connected to cover and passing through said duct.

10. The oxygen separator of claim 9, wherein:

said duct has at least two sections;

said header plate is connected to at least one of the two sections;

said header plate and said tube sheet have peripheral flanges connected to one another to connect said two sections to one another.

11. The oxygen separator of claim 9, further comprising:

a supplemental cool air inlet of said duct for introduction of cool air into said duct to cool said oxygen within said oxygen-selective ceramic membranes while being heated to an elevated temperature;

said at least one opening of said header plate comprising a radial array of openings;

said tube sheet, said header plate, and said cover each having an annular configuration to define aligned, concentric central inner openings thereof; and a sleeve connected to said tube sheet and aligned with said central, inner opening thereof to conduct said heated oxygen containing gas to said oxygen-selective ceramic membranes downstream of said supplemental cool air inlet of said duct.

12. The oxygen separator of claim 4, wherein said oxygen-selective ceramic membranes are oriented at right angles to a flow of the heated oxygen containing gas.

13. A method of separating oxygen from compressed air flowing to a burner of a gas turbine, said method comprising:

heating the compressed air by burning a fuel to form a heated oxygen containing gas;

receiving said heated oxygen containing gas within an elongated duct open at opposite ends and connected to and mounted on said burner of said gas turbine;

extracting said oxygen from said heated oxygen containing gas by permeating ions of said oxygen through a plurality of oxygen-selective ceramic membranes;

the oxygen-selective ceramic membranes being mounted within said duct so that said oxygen separates from said heated oxygen containing gas and collects within said oxygen-selective ceramic membranes and an external flow of said oxygen depleted gas forms within said duct;

discharging said oxygen depleted gas from an opposite end of said duct; and recovering said oxygen from said oxygen-selective ceramic membranes.

14. The method of claim 13 wherein said heated oxygen containing gas is received within one of said opposite ends of said duct from a pre-burner connected thereto and said oxygen depleted gas is directly discharged to a burner of said gas turbine from the other of the said opposite ends thereof.

15. The method of claim 13 wherein said oxygen after having been recovered is cooled and then compressed.

16. The method of claim 13 wherein said oxygen-selective ceramic membranes are purged with a purge a gas.

17. The method of claim 13 further comprising compressing a supplementary air stream at least equivalent in volume to the oxygen product removed to form a supplementary compressed feed air stream and introducing said supplementary compressed feed air stream to cool said oxygen and supporting structure of said oxygen-selective ceramic membranes.

18. The method of claim 13, wherein each of said oxygen-selective ceramic membranes is of elongated, tubular configuration having closed ends and opposite, open ends;

oxygen is recovered from said open ends of said oxygen-selective ceramic membranes;

said fuel is introduced into burner tubes fabricated from oxygen-selective ceramic membrane material and located within said duct upstream of said oxygen-selective ceramic membranes;

said fuel is burned in the burner tubes and in the presence of permeated oxygen from the compressed air to heat said compressed air and thereby to form combustion products; and said combustion products are introduced into said oxygen-selective ceramic membranes as a purge gas.

\* \* \* \* \*